(12) United States Patent
Su

(10) Patent No.: US 8,473,968 B2
(45) Date of Patent: Jun. 25, 2013

(54) DRIVING METHOD AND APPLICATION THEREOF

(75) Inventor: Chih-An Su, Taipei Hsien (TW)

(73) Assignee: Wistron Corp., Taipei Hsien (TW)

( * ) Notice: Subject to any disclaimer, the term of this patent is extended or adjusted under 35 U.S.C. 154(b) by 803 days.

(21) Appl. No.: 12/465,880

(22) Filed: May 14, 2009

(65) Prior Publication Data

US 2009/0313643 A1 Dec. 17, 2009

(30) Foreign Application Priority Data

Jun. 13, 2008 (TW) ................................ 97122229 A

(51) Int. Cl.
G06F 3/00 (2006.01)

(52) U.S. Cl.
USPC ........................................................ 719/319

(58) Field of Classification Search
USPC ........................................................ 719/319
See application file for complete search history.

(56) References Cited

U.S. PATENT DOCUMENTS

| | | | |
|---|---|---|---|
| 5,909,576 A | 6/1999 | Fulk | |
| 6,247,067 B1 * | 6/2001 | Berliner et al. | 719/321 |
| 6,760,784 B1 * | 7/2004 | Bodin et al. | 719/323 |
| 7,689,987 B2 * | 3/2010 | Neil | 718/1 |
| 7,705,853 B2 * | 4/2010 | Stauffer et al. | 345/568 |
| 7,725,305 B2 * | 5/2010 | Taillefer et al. | 703/23 |
| 8,013,804 B2 * | 9/2011 | Cromer et al. | 345/1.1 |
| 2002/0129274 A1 * | 9/2002 | Baskey et al. | 713/201 |
| 2002/0143842 A1 | 10/2002 | Cota-Robles et al. | |
| 2004/0160449 A1 * | 8/2004 | Gossalia et al. | 345/543 |
| 2007/0011444 A1 * | 1/2007 | Grobman et al. | 713/2 |
| 2010/0107158 A1 * | 4/2010 | Chen et al. | 718/1 |

FOREIGN PATENT DOCUMENTS

TW 200743968 12/2007

OTHER PUBLICATIONS

Tristan Richardson, Virtual network computing, 1998.*
English translation of relevant portion of Taiwan Office Action dated Jan. 13, 2012.
Taiwan Office Action dated Jan. 13, 2012.
English translation of abstract and claim 1 of TW 200743968.
English translation of relevant portion of China Office Action dated Nov. 9, 2011.
China Office Action dated Nov. 9, 2011.

* cited by examiner

*Primary Examiner* — Lechi Truong
(74) *Attorney, Agent, or Firm* — McClure, Qualey & Rodack, LLP

(57) ABSTRACT

A driving method for a video device is disclosed. The driving method includes following steps. Obtaining a first instruction from a virtual file system of a first operating system. Converting the first instruction into a second instruction compatible with a second operating system. Virtualizing a kernel of the second operating system. Controlling a video driver according to the second instruction through the kernel of the second operating system. A driving module for a video device is also disclosed.

13 Claims, 4 Drawing Sheets

DRIVING METHOD AND APPLICATION THEREOF

RELATED APPLICATIONS

This application claims priority to Taiwan Application Serial Number 97122229, filed Jun. 13, 2008, which is herein incorporated by reference.

BACKGROUND

1. Field of Invention

The present invention relates to a driving method and application thereof. More particularly, the present invention relates to a driving method and application thereof for a video device.

2. Description of Related Art

Drivers are hardware-dependent and operating-system-specific. Most companies provide only drivers for Microsoft Windows. As Linux is becoming more popular, there is a need for developing drivers for Linux.

Video for Linux (V4L) is released for developing drivers for video devices under Linux. Furthermore, the new generation of Video for Linux 2(V4L2) has also been released recently. Although V4L and V4L2 have been released, there are still few drivers for video devices under Linux.

Above all, there is a need for driving video devices under Linux through drivers for Microsoft Windows.

SUMMARY

According to one embodiment of this invention, a driving method includes following steps:

(1) Obtaining a first instruction from a virtual file system of a first operating system.

(2) Converting the first instruction into a second instruction compatible with a second operating system.

(3) Virtualizing a kernel of the second operating system.

(4) Controlling a video driver according to the second instruction through the kernel of the second operating system.

According to another embodiment of this invention, a driving module includes a virtual device, an instruction-converting module and a virtual kernel. The virtual device obtains a first instruction from a virtual file system of a first operating system. The instruction-converting module applies means for converting the first instruction into a second instruction compatible with a second operating system. The virtual kernel virtualizes a kernel of the second operating system to control a video driver to drive the video device according to the second instruction.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
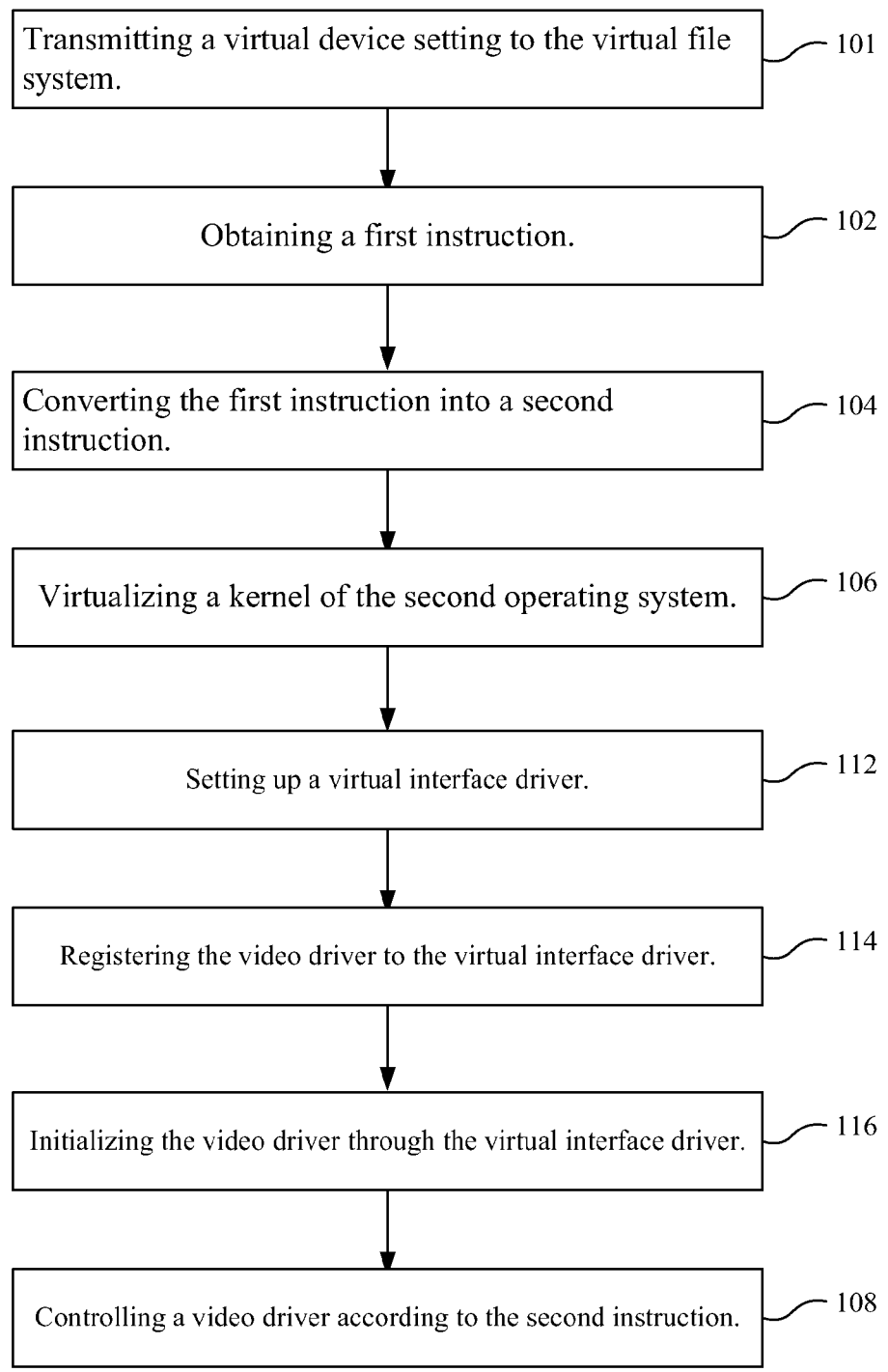
FIG. 1 is a flow diagram of a driving method 100 for a video device according to an embodiment of this invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a flow diagram of a driving method 100 for a video device according to an embodiment of this invention. The driving method 100 controls the video device on a first operating system by utilizing a driver for the video device for a second operating system. Therefore, the driving method 100 includes:

(1) Obtaining a first instruction from a virtual file system of a first operating system (step 102).

(2) Converting the first instruction into a second instruction compatible with a second operating system (step 104).

(3) Virtualizing a kernel of the second operating system (step 106).

(4) Controlling a video driver to drive a video device according to the second instruction through the kernel of the second operating system, wherein the video driver is the driver for the video device for the second operating system (step 108).

For example, the first operating system may be Linux, and the second operating system may be Microsoft Windows in this embodiment. Therefore, the first instruction obtained may be an application command of Linux. In the step 104, the second instruction may be an application command of Microsoft Windows. The video driver drives the video device under Microsoft Windows. In addition, the video driver may follow Windows Driver Model (WDM). Therefore, the driving method 100 may drive the video device under the first operating system utilizing the video driver for the second operating system.

The virtual file system may transmit the first instruction (step 102) after receiving the device setting. Therefore, before obtaining the first instruction (step 102), the driving method 100 may include:

(1.1) Transmitting a virtual device setting to the virtual file system (step 101).

The virtual file system may recognize the virtual device setting as a device setting from a physical device. After the virtual file system receives the virtual device setting, the virtual file system may transmit the first instruction.

Before controlling the video driver to drive the video device (step 108), the video driver needs to be initialized. Therefore, the driving method 100 may include:

(3.1) Setting up a virtual interface driver in the kernel of the second operating system (step 112).

(3.2) Registering the video driver to the virtual interface driver (step 114).

(3.3) Initializing the video driver through the virtual interface driver (step 116).

The virtual interface driver drives a connecting interface through the video driver, and the video driver drives the video device through the connecting interface. In practice, the connecting interface may be a Universal Serial Bus (USB), IEEE1394, Peripheral Controller Interface (PCI), PCI Express or any other connecting interface. Therefore, the video driver can be controlled to drive the video device after initialized.

Figure 2:
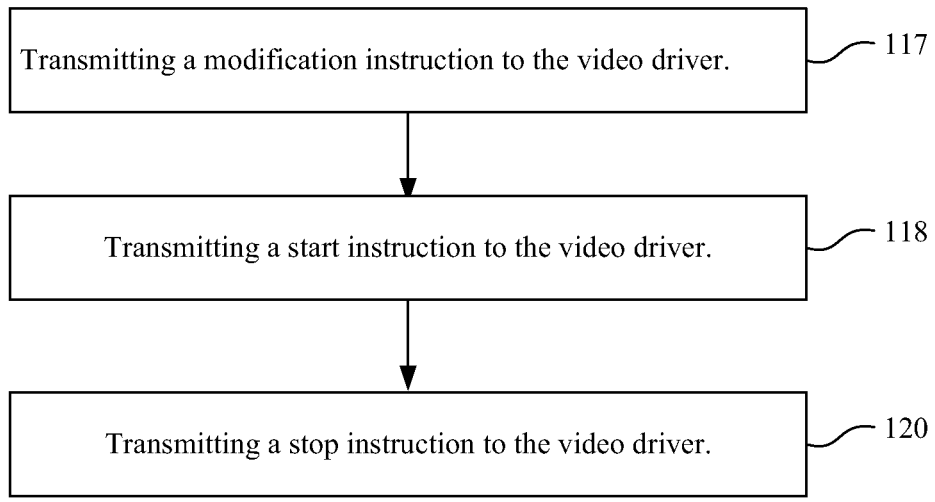
FIG. 2 is an embodiment for controlling the video driver (step 108) in FIG. 1.

FIG. 2 is an embodiment for controlling the video driver (step 108) in FIG. 1. Controlling the video driver (step 108) may include:

(4.2) Transmitting a start instruction to the video driver through the virtual interface driver (step 118).

After the video driver receives the start instruction, the video driver may control the video device to start to transmit video stream.

In addition, the video driver may be modified before transmitting the start instruction (step 118). Therefore, controlling the video driver (step 108) may include:

(4.1) Transmitting a modification instruction to the video driver through the virtual interface driver (step 117).

Therefore, the video driver may modify the video device according to the modification instruction. For example, the video driver may modify the format of the video stream, the status of the video device, or any other modification for the video device.

Furthermore, controlling the video driver (step 108) may include:

(4.3) Transmitting a stop instruction to the video driver through the virtual interface driver (step 120).

After receiving the stop instruction, the video driver may make the video device stop transmitting the video stream.

Figure 3:
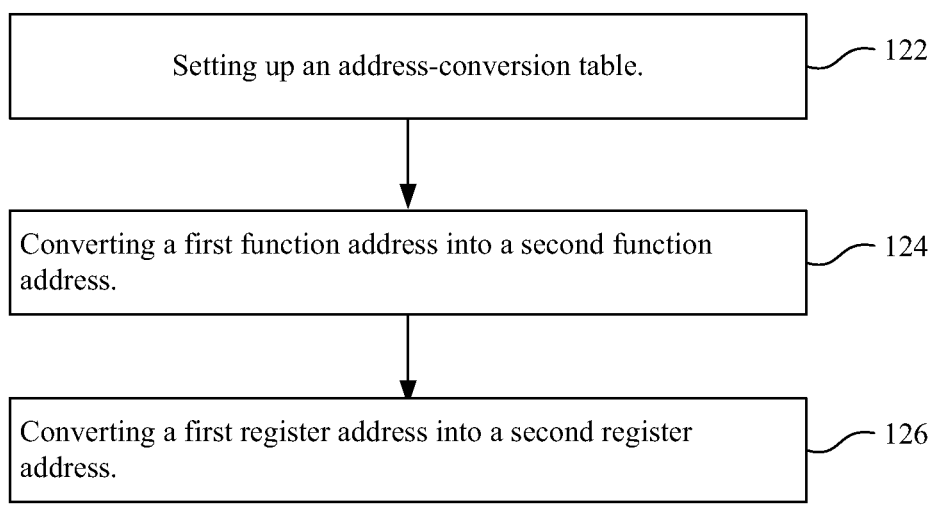
FIG. 3 is an embodiment for virtualizing the kernel of the second operating system (step 106) in FIG. 1.

FIG. 3 is an embodiment for virtualizing the kernel of the second operating system (step 106) in FIG. 1. Since the function address and the register address of the second instruction may still utilize the address format of the first operating system, virtualizing the kernel of the second operating system (step 106) may include:

(3.a) Setting up an address-conversion table (step 122).

(3.b) Converting a first function address of the second instruction into a second function address according to the address-conversion table (step 124).

(3.c) Converting a first register address of the second instruction into a second register address according to the address-conversion table (step 126).

Therefore, the kernel of the second operating system may recognize the second function address and the second register address. In other words, the virtualized kernel of the second operating system may execute the second instruction according to the second function address and the second register address.

Figure 4:
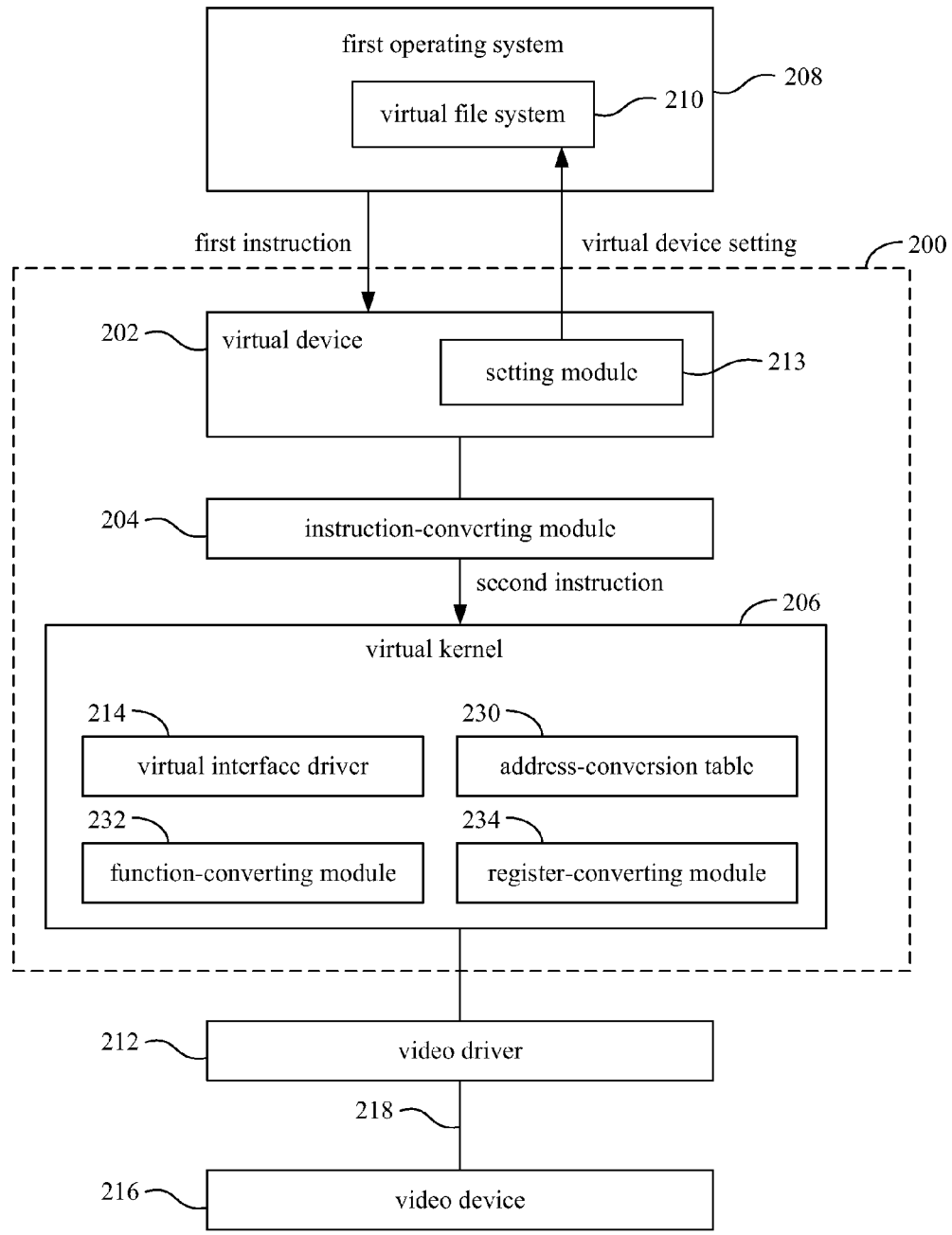
FIG. 4 is a block diagram of a driving module 200 for a video device 216 according another embodiment of this invention.

FIG. 4 is a block diagram of a driving module 200 for a video device 216 according another embodiment of this invention. The driving module 200 may utilize a video device's driver for one operating system to control the video device under another operating system. The driving module 200 includes a virtual device 202, an instruction-converting module 204 and a virtual kernel 206. The virtual device 202 obtains a first instruction from a virtual file system 210 of a first operating system 208. The first instruction may be an application command of the first operating system 208. The instruction-converting module 204 applies means for converting the first instruction into a second instruction compatible with the second operating system. In detail, the second instruction may be an application command of the second operating system. The virtual kernel 206 virtualizes a kernel of the second operating system to control a video driver 212 to drive the video device 216 according to the second instruction. The video driver 212 is the driver for the video device 216 for the second operating system. Therefore, the driving module 200 may utilize the driver for the video device 216 for the second operating system under the first operating system.

For example, the first operating system may be Linux, and the second operating system may be Microsoft Windows. The virtual device 202 may follow Video for Linux (V4L) or Video for Linux 2 (V4L2). The video driver 212 may be the driver for the video device 216 for Microsoft Windows. In detail, the video driver 212 may follow Windows Driver Model (WDM). Therefore, in this example the driving module may utilize the driver for Microsoft Windows under Linux.

Before the virtual device 202 obtains the first instruction from the virtual file system 210, the virtual device may transmit a virtual device setting to make the virtual file system 210 recognize the virtual device 202 as a physical device. Therefore, the virtual device 202 may include a setting module 213. The setting module 213 applies means for transmitting a virtual device setting to the virtual file system 210. After the virtual file system 210 receives the virtual device setting, the virtual file system 210 may recognize the virtual device 202 as a physical device and transmits the first instruction to the virtual device 202.

The virtual kernel 206 may include a virtual interface driver 214. The virtual interface driver 214 drives the video driver 212 to control a connecting interface 218, wherein the video driver 212 controls the video device through the connecting interface 218. In practice, the connecting interface 218 may be a Universal Serial Bus (USB), IEEE1394, Peripheral Controller Interface (PCI), PCI Express or any other connecting interface.

Since the function address and the register address of the second instruction may still utilize the address format of the first operating system, the virtual kernel 206 may process the function address and the register address of the second instruction. Therefore, the virtual kernel 206 may include an address-conversion table 230, a function-converting module 232 and a register-converting module 234. The function-converting module 232 applies means for converting a first function address of the second instruction into a second function address according to the address-conversion table 230. The register-converting module 234 applies means for converting a first register address of the second instruction into a second register address according to the address-conversion table 230. Therefore, the virtual kernel 206 may recognize the second function address and the second register address. In other words, the virtual kernel 206 may execute the second instruction according to the second function address and the second register address.

Figure 5:
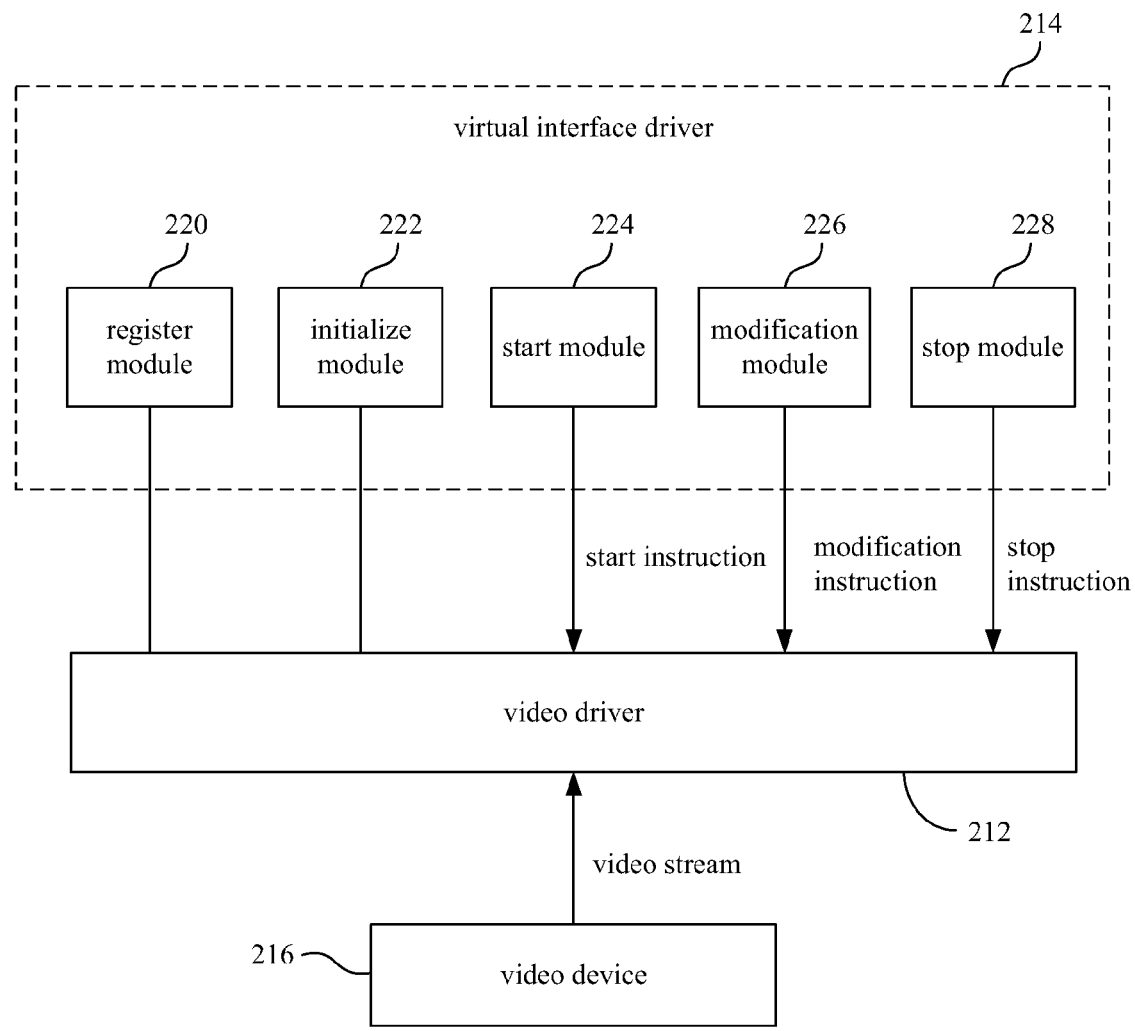
FIG. 5 is an embodiment of the virtual interface driver 214 in FIG. 4.

FIG. 5 is an embodiment of the virtual interface driver 214 in FIG. 4. The virtual interface driver 214 includes a register module 220 and an initialize module 222. The register module 220 applies means for registering the video driver 212 to the virtual interface driver 214. The initialize module 222 applies means for initializing the video driver 212 after the video driver 212 registers to the virtual interface driver 214. Therefore, the video driver 212 may be initialized.

The virtual interface driver 214 may include a start module 224. The start module applies means for transmitting a start instruction to the video driver 212. Therefore, the video driver 212 may drive the video device 216 to start to transmit video stream after receiving the start instruction.

The virtual interface driver 214 may include a modification module 226. The modification module 226 applies means for transmitting a modification instruction to the video driver 212 before transmitting the start instruction. The video driver 212 may modify the video device 216 according to the modification instruction. For example, the modification instruction may be instructions for modifying the format of the video stream, the status of the video device 216, or any other modification for the video device 216.

The virtual interface driver 214 may include a stop module 228. The stop module 228 applies means for transmitting a stop instruction to the video driver 212. The video driver 212 drives the video device 216 to stop transmitting the video stream after receiving the stop instruction.

Although the present invention has been described in considerable detail with reference to certain embodiments thereof, other embodiments are possible. Therefore, their spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A driving method for a video device comprising:
   obtaining a first instruction of a first operating system from a virtual file system of the first operating system;
   converting the first instruction of the first operating system into a second instruction of a second operating system, wherein the first operating system is different from the second operating system;
   virtualizing a kernel of the second operating system; and
   controlling a video driver for the video device for the second operating system to drive the video device according to the second instruction of the second operating system through the virtualized kernel of the second operating system;
   setting up a virtual interface driver in the kernel of the second operating system, wherein the virtual interface driver drives a connecting interface through the video driver, and the video driver drives the video device through the connecting interface;
   registering the video driver to the virtual interface driver; and
   wherein the step of controlling the video driver comprises:
   transmitting a start instruction to the video driver through the virtual interface driver, such that the video driver drives the video device to start transmitting video stream.

2. The driving method of claim 1 further comprising:
   transmitting a virtual device setting to the virtual file system.

3. The driving method of claim 1, wherein the step of controlling the video driver further comprises:
   transmitting a modification instruction to the video driver through the virtual interface driver, such that the video driver modifies the video device according to the modification instruction.

4. The driving method of claim 1, wherein the step of controlling the video driver further comprises:
   transmitting a stop instruction to the video driver through the virtual interface driver, such that the video driver drives the video device to stop transmitting the video stream.

5. The driving method of claim 1, wherein virtualizing the kernel of the second operating system comprises:
   setting up an address-conversion table;
   converting a first function address of the second instruction into a second function address of the second instruction according to the address-conversion table; and
   converting a first register address of the second instruction into a second register address of the second instruction according to the address-conversion table.

6. A driving module for a video device comprising:
   a virtual device for obtaining a first instruction of a first operating system from a virtual file system of the first operating system;
   means for converting by processor the first instruction of the first operating system into a second instruction of a second operating system, wherein the first operating system is different from the second operating system; and
   a virtual kernel for virtualizing a kernel of the second operating system to control a video driver for the video device for the second operating system to drive the video device according to the second instruction of the second operating system,
   means for setting up a virtual interface driver in the kernel of the second operating system, wherein the virtual interface driver drives a connecting interface through the video driver, and the video driver drives the video device through the connecting interface;
   registering the video driver to the virtual interface driver; and
   wherein the step of controlling the video driver comprises:
   transmitting a start instruction to the video driver through the virtual interface driver, such that the video driver drives the video device to start transmitting video stream.

7. The driving module of claim 6, wherein the virtual device comprises means for transmitting a virtual device setting to the virtual file system, such that the virtual file system recognizes the virtual device as a physical device and transmit the first instruction to the virtual device.

8. The driving module of claim 6, wherein the virtual kernel comprises a virtual interface driver for controlling the video driver to drive a connecting interface, and the video driver controls the video device through the connecting interface.

9. The driving module of claim 8, wherein the virtual interface driver comprises:
   means for registering the video driver to the virtual interface driver; and
   means for initializing the video driver.

10. The driving module of claim 8, wherein the virtual interface driver comprises means for transmitting a start instruction to the video driver, such that the video driver drives the video device to start to transmit video stream.

11. The driving module of claim 10, wherein the virtual interface driver further comprises means for transmitting a modification instruction to the video driver, such that the video driver modifies the video device according to the modification instruction.

12. The driving module of claim 10, wherein the virtual interface driver further comprises means for transmitting a stop instruction to the video driver, such that the video driver drives the video device to stop transmitting the video stream.

13. The driving module of claim 6, wherein the virtual kernel comprises:
   an address-conversion table;
   means for converting a first function address of the second instruction into a second function address according to the address-conversion table; and
   means for converting a first register address of the second instruction into a second register address according to the address-conversion table.

* * * * *